United States Patent [19]
Saint Upery et al.

[11] Patent Number: 5,957,412
[45] Date of Patent: Sep. 28, 1999

[54] METHOD AND DEVICE FOR VERTICAL GUIDANCE OF AN AIRCRAFT

[75] Inventors: Yves Saint Upery, Toulouse; Eric Peyrucain, Saint Genies Bellevue, both of France

[73] Assignee: Aerospatiale Societe Nationale Industrielle, Paris, France

[21] Appl. No.: 08/936,549

[22] Filed: Sep. 24, 1997

[30] Foreign Application Priority Data

Oct. 3, 1996 [FR] France ................................. 96 12049

[51] Int. Cl.$^6$ ....................................................... G05D 1/08
[52] U.S. Cl. ........................ 244/180; 244/181; 244/183; 244/185; 244/187; 701/14; 701/16
[58] Field of Search ................................. 244/180, 181, 244/183, 185, 187; 701/14, 16

[56] References Cited

U.S. PATENT DOCUMENTS

| | | | |
|---|---|---|---|
| 4,021,009 | 5/1977 | Baker et al. | 244/180 |
| 4,609,988 | 9/1986 | Zweifel | 364/433 |
| 4,956,780 | 9/1990 | Sankrithi et al. | 244/183 |
| 5,406,487 | 4/1995 | Tanis | 364/428 |
| 5,695,156 | 12/1997 | Firuz et al. | 244/180 |
| 5,826,834 | 10/1998 | Potter et al. | 244/181 |

FOREIGN PATENT DOCUMENTS

| | | |
|---|---|---|
| 0034874A | 9/1981 | European Pat. Off. . |
| 2240957 | 8/1991 | United Kingdom . |

*Primary Examiner*—J. Woodrow Eldred
*Attorney, Agent, or Firm*—Stevens, Davis, Miller & Mosher, L.L.P.

[57] ABSTRACT

The present invention relates to a method and a device for guiding an aircraft (A) according to a prescribed vertical flight path (T).
According to the invention:
  the vertical distance he between said aircraft (A) and said flight path (T) is determined;
  the difference ve between the actual vertical velocity (Vz) of the aircraft (A) and the vertical velocity (Vzth) which it would have on the flight path (T) is determined;
  a vertical acceleration variation Anz is calculated:

$$\Delta nz = ((k1.(he-hc)) + (ve-vc)).k2$$

k1 and k2 being characteristic coefficients, hc and vc being precontrol terms, and k1.(he−hc) being restricted; and
  said restricted variation Anz is applied to the aircraft.

13 Claims, 5 Drawing Sheets

METHOD AND DEVICE FOR VERTICAL GUIDANCE OF AN AIRCRAFT

The present invention relates to a method for guiding an aircraft in a vertical plane along a predefined flight path, as well as to a device for implementing said method.

In the context of the present invention, said predefined flight path, which is determined in said vertical plane, is formed by successive straight segments.

The guidance of an aircraft, in particular a transport aircraft, along such a vertical flight path presupposes, if the aircraft is not on said flight path at the start of the guidance, implementation of a steering operation intended to bring said aircraft onto said flight path. In the context of the present invention, such a steering operation is referred to as "flight path joining", while the guidance proper of the aircraft along a predefined flight path (joined beforehand if necessary) is referred to as "following".

It is known that, on many types of aircraft, such a vertical flight path can be determined by the flight management computer, in particular during the phases of descent and approach to a landing area.

However, the known guidance methods which are currently used are not precise. Further, the guidance is generally carried out with a high vertical acceleration and sawtooth variations in attitude and engine speed, which leads to discomfort, in particular for the passengers, as well as to the generation of significant structural stresses on said aircraft and premature wear of the engines.

The object of the present invention is to overcome these drawbacks. It relates to a method for guiding an aircraft in a vertical plane, making it possible to join and follow, in simple, accurate and smooth fashion, a prescribed flight path which is defined in said vertical plane and formed by adjacent straight segments.

To this end, according to the invention, said method is noteworthy in that the following operations are performed repeatedly:
the straight segment which belongs to said flight path and relative to which said aircraft is to be guided, is determined;
the vertical distance he, between said aircraft and the guidance segment thus determined, is determined;
the velocity difference ve between the actual vertical velocity of the aircraft (A) and the vertical velocity which it would have if it moved along said guidance segment, for an equal velocity parallel to the ground, is determined;
a vertical acceleration variation Anz is calculated from the equation:

$$\Delta nz = ((k1.(he-hc)) + (ve-vc)).k2$$

in which:
k1 and k2 represent characteristic coefficients,
hc and vc represent precontrol terms, of nonzero values when the aircraft is in flight path joining status, and of zero values when the aircraft is in flight path following status, and
the product $k1.(he-hc)$ is restricted between two predefined values; and
the vertical acceleration variation Anz thus calculated and restricted between two predefined values is applied as control input to the aircraft.

Thus, by virtue of said vertical acceleration variation applied to the aircraft, accurate and smooth guidance of the aircraft following said predefined flight path is obtained.

It will be noted that said vertical acceleration variation may be converted into an attitude variation which is then transmitted directly as control input, if appropriate, to the automatic pilot of the aircraft, for example a civil transport aircraft an automatic pilot generally using an attitude variation as input.

Further, the engine speed of the aircraft varies little, which leads to a reduction both in the fuel consumption and in the fatigue of the engine.

It will also be noted that the precontrol terms allow the aircraft to return to said prescribed flight path according to a predefined path.

Advantageously, in order to improve comfort further:
on the one hand, the product $k1.(he-hc)$ is restricted between two values which depend on the flight phase and make it possible to guide the aircraft with a restricted vertical velocity. Advantageously, a limit of less than −10 m/s may be adopted in approach; and
on the other hand, the vertical acceleration variation applied as control input to the aircraft is restricted between two values, advantageously plus and minus 0.08 g, g representing the acceleration due to gravity, allowing smooth guidance of the aircraft.

According to the invention, the aircraft is considered to be in joining status for a straight segment of the flight path when it can join said straight segment with a constant vertical acceleration, which requires the least number of abrupt variations in the attitude of the aircraft and therefore makes it possible to improve comfort.

More precisely, advantageously, the aircraft is considered to be in joining status for the flight path when the following conditions are satisfied:
the constant vertical acceleration $Nz=(ve^2)/(2he)$ with which the aircraft could join the prescribed trajectory lies in a predefined interval, preferably plus and minus 0.15 g;
the terms ve and he are of opposite signs; and
the velocity of the aircraft is restricted to a predefined value.

Further, advantageously, the precontrol terms hc and vc which will make it possible to guide the aircraft following a joining path with constant vertical acceleration Nzo are determined from the following equations:

$$\begin{cases} vc = \int Nzo \cdot dt + veo \\ hc = \int vc \cdot dt + heo \end{cases}$$

in which:
veo and heo are the values of ve and he respectively at the start of joining, and
Nzo is defined by the equation $Nzo=(veo^2)/(2heo)$.

Further, the aircraft, considered to be in joining status, changes to following status when the velocity difference ve becomes less than a predetermined threshold.

Moreover, advantageously, in order to determine said guidance segment, said flight path having a decreasing altitude, possibly with level sections:
a) when the method is initially implemented, an initial segment is determined as the guidance segment; and
b) during the guidance, the segment which follows the current guidance segment in the direction of displacement of the aircraft is determined as the guidance segment each time one of the following situations is satisfied:
the altitude of the aircraft is less than the altitude of the extreme point, in the direction of displacement of the aircraft, of said current guidance segment;
the aircraft is downstream, in the direction of displacement, of said extreme point of the current guidance segment;

the aircraft is in follow status for said current guidance segment and is in actual joining status for the following segment; and the aircraft is in joining status both for the current guidance segment and for the following segment, but can no longer return to said current guidance segment before having passed the extreme point of said current guidance segment.

Further, according to the invention, the characteristic coefficients k1 and k2 are advantageously calculated from the equations:

$$k1 = w/(2.\xi) \quad k2 = (2.\xi w)/g$$

in which:

g represents the acceleration due to gravity,

ξ represents a damping term, and w represents an angular frequency term at the resonant frequency.

Of course, as regards said terms ξ and w, values determined theoretically by the person skilled in the art are used for implementing the invention. However, according to the invention, in order to obtain the most advantageous values for a given aircraft, preferably, in a second step, a plurality of guidance operations are carried out with different terms, making it possible to refine the theoretically determined parameters, and the values used for implementing the method are those for which the flight path is joined and followed optimally, with respect to predefined conditions.

The present invention also relates to a device for implementing the aforementioned method.

According to the invention, said device is noteworthy in that it includes:

a first computation unit which can determine the guidance segment and comprises:
  a first computer which can determine said vertical distance he, and
  a second computer which can determine said velocity difference ve; and
a second computation unit which is connected to said first computation unit and can calculate said vertical acceleration variation Δnz and transmit it to the automatic pilot of the aircraft.

Advantageously, said second computation unit includes:
an auxiliary computer which can calculate the precontrol terms hc and vc;
a first computer which is connected to said auxiliary computer and can calculate the difference he−hc;
a second computer which is connected to said first computer and can calculate the product k1.(he−hc);
a third computer which can restrict the value calculated and delivered by the second computer;
a fourth computer which is connected to said auxiliary computer and can calculate the difference ve−vc;
a fifth computer which can calculate the sum of the results delivered by the third and fourth computers;
a sixth computer which can multiply by k2 the result delivered by the fifth computer; and
a seventh computer which can restrict the result delivered by the sixth computer and transmit this result as control input.

Moreover, the device according to the invention may include a means which can determine whether the aircraft is in joining status for the flight path.

The figures of the appended drawing will clearly show how the invention may be embodied. In these figures, identical references denote similar elements.

Figure 1:
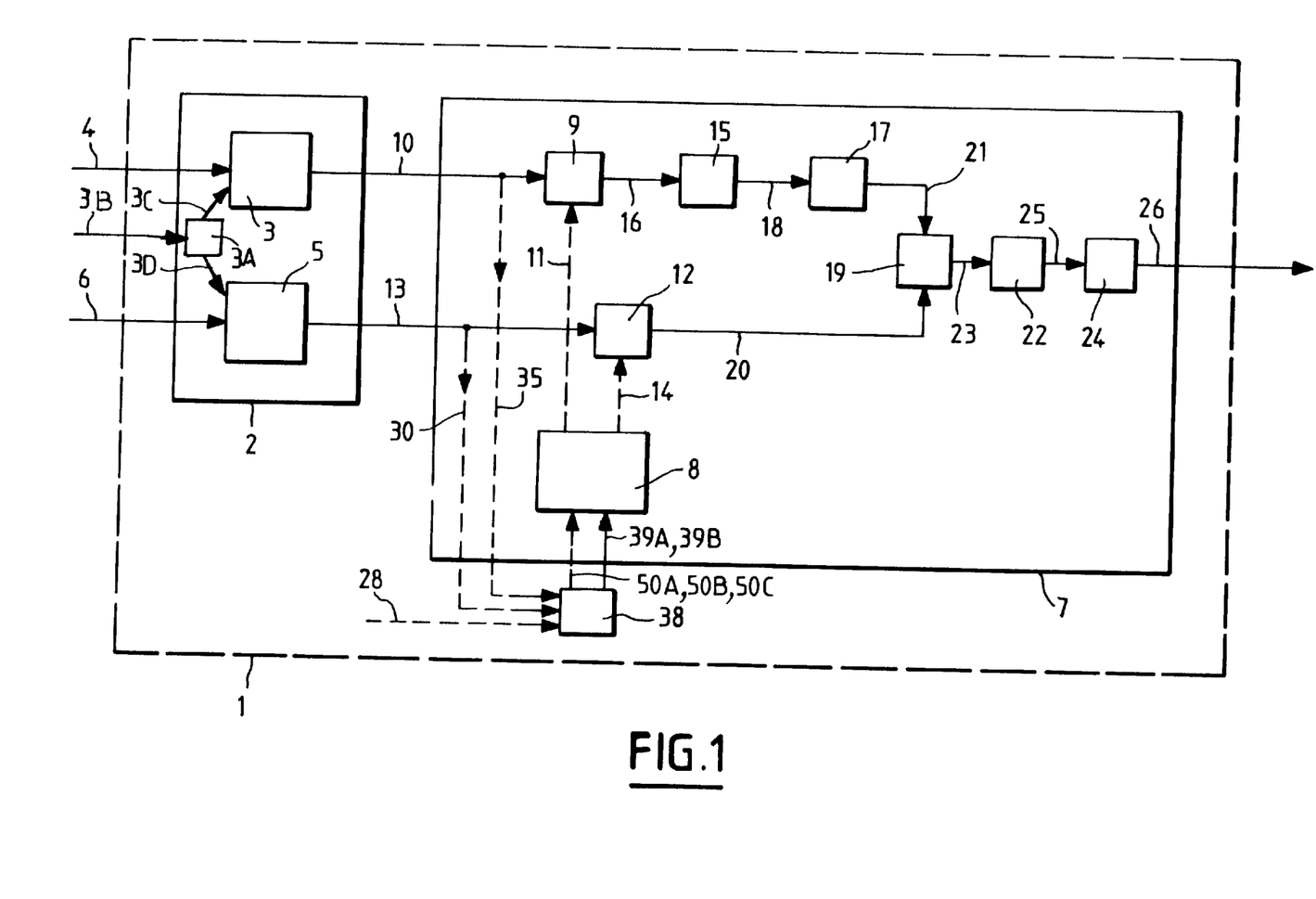
FIG. 1 is the block diagram of a device according to the invention.

The device 1, according to the invention and represented schematically in FIG. 1, is intended to be fitted on board an aircraft A, in particular a transport aircraft, in order to guide said aircraft A in a vertical plane along a predefined flight path T.

Figure 2:
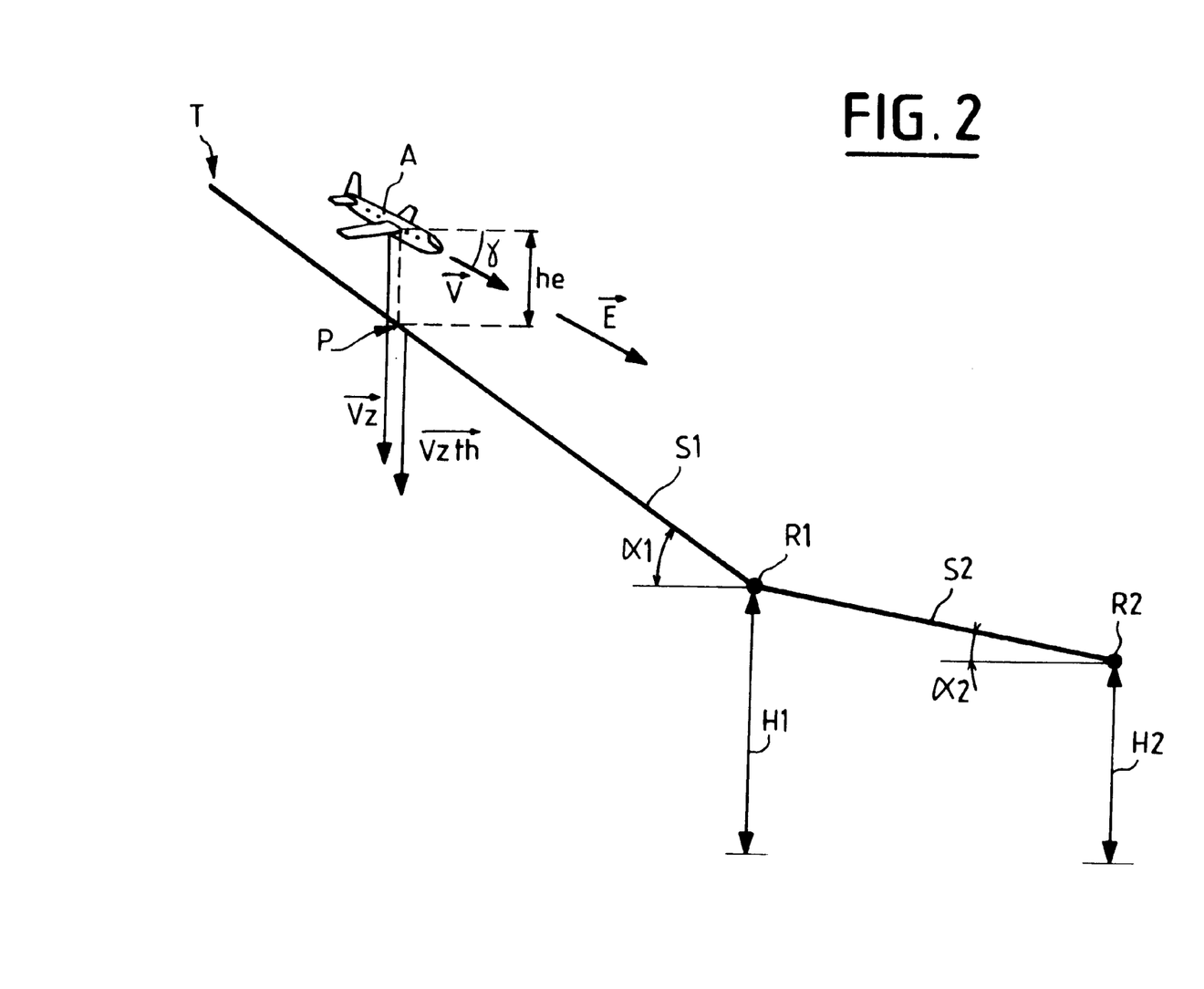
FIG. 2 illustrates the guidance mode, according to the invention, for an aircraft relative to a predefined flight path.

In the scope of the present invention, said predefined flight path T, partially represented in FIG. 2, is formed by successive straight segments S1, S2. Each of said straight segments S1 and S2 has a constant slope α1, α2 relative to the horizontal. Said straight segments S1 and S2 are further characterized by the position of their extreme point R1 and R2 in the direction of displacement ($\vec{E}$) of the aircraft A.

Depending on the position at the start of the guidance of said aircraft A relative to said flight path T, the envisaged guidance is carried out either on the basis of the following two phases, or only on the basis of the last of said phases, namely:

a joining phase intended to bring the aircraft A onto said flight path T, and a following phase making it possible for the aircraft A lying on said flight path T to be moved along it.

Said device 1 implements a guidance method according to the invention, allowing said aircraft A to join and follow said flight path T in simple, accurate and smooth fashion.

According to the invention, said method is noteworthy in that:

the segment S1 or S2 which belongs to said flight path T and with respect to which the aircraft A is to be guided, is determined, namely the segment S1 in the example which is represented, as will be seen below;

the vertical distance he, between said aircraft A and its vertical projection P onto the guidance segment S1 determined beforehand, is determined;

the velocity difference ve between the actual vertical velocity Vz of the aircraft A and the vertical velocity Vzth which it would have it moved along said guidance segment S1, for an equal velocity parallel to the ground, is determined;

a vertical acceleration variation Δnz for the aircraft A is calculated from the equation:

$$\Delta nz = ((k1.(he-hc)) + (ve-vc)).k2 \qquad (1)$$

in which:

k1 and k2 represent characteristic coefficients specified below, hc and vc represent precontrol terms, of nonzero values when the aircraft is in joining status for the flight path T, and of zero values when the aircraft is in following status for the flight path T, and the product k1.(he−hc) is restricted between two predefined values; and the vertical acceleration variation Δnz thus calculated and restricted between two predefined values is applied as control input to the aircraft A.

In order to demonstrate clearly the accuracy of the present invention, the aforementioned expression (1), and in particular the calculation of the characteristic coefficients k1 and k2, will be explained below with reference to FIG. 2.

The vertical acceleration nz of the aircraft A is defined, according to the known equations of flight mechanics, on the basis of the expression:

$$nz = \cos\gamma + (V_{ground} \cdot \dot{\gamma})\,g$$

in which:
$V_{ground}$ is the velocity of the aircraft relative to the ground (taking into account the effects of wind),
$\gamma$ is the angle between said velocity vector $\vec{V}$ and the horizontal, and
g represents the acceleration due to gravity.

Assuming that the angle $\gamma$ is small and that the term $V_{ground}$ varies slowly, the following approximation is obtained:

$$Vz = V_{ground}.\sin\gamma \approx V_{ground}.\gamma$$

It can be deduced from this that:

$$nz = 1 + (\dot{V}z)/g = 1 + \Delta nz, \text{ writing } \Delta nz = (\dot{V}z)/g$$

Further, according to the definition ve and he, the following equation is found:

$$\dot{he} = \dot{ve} = -\dot{V}z$$

so that, in Laplace notation, the following system is obtained:

$$\begin{cases} ve = -(1 \cdot p) \cdot (\dot{V}z) \\ he = -(1/p^2) \cdot (\dot{V}z) \end{cases}$$

Further, according to a classical result of mathematics, in order to determine a parameter $\Delta nz$ on the basis of two variable parameters ve and he, it is necessary to use a law of the type:

$$\Delta nz = c1.he + c2.ve \quad (1a)$$

with c1 and c2 being two characteristic coefficients.
The following expression is deduced from equation (1a):

$$\Delta nz = -(c1/p^2).\dot{V}z - (c2/p).\dot{V}z$$

which makes it possible to obtain the equation:

$$p^2 + c2.g.p + c1.g = 0$$

By identifying this last equation with a second degree equation of the type:

$$p^2 + 2.\xi.w.p + w^2 = 0$$

with $\xi$ being a damping term and w the angular frequency at the resonant frequency, the following values of the coefficients c1 and c2 are obtained:

$$c1 = (w^2)/g \quad (2)$$

$$c2 = (2.\xi.w)/g \quad (3)$$

Said formula (1a) can be written:

$$\Delta nz = c2 \cdot \left(\frac{c1}{c2} \cdot he + ve\right) \quad (3a)$$

The following notation will henceforth be used:

$$k1 = \frac{c1}{c2} \text{ and } k2 = c2 \quad (3b)$$

Consequently, to restrict the vertical velocity in order, for example, to prevent the aircraft from coming onto the guidance segment too directly and too quickly, it is sufficient to restrict the expression (k1.he).

Further, equation (3a) differs from equation (1) solely on account of the precontrol terms hc and vc introduced in said equation (1). The role and the method of calculating these precontrol terms hc and vc will be specified later in the description.

It will further be noted that, for the terms $\xi$ and w, use may be made of the values recommended by theory.

However, in order to obtain the most advantageous values for a given aircraft A, as well as for given guidance conditions, according to the invention, in a second step, a plurality of guidance operations are carried out with different terms, making it possible to refine the theoretically determined parameters, and the values used for implementing the method are those for which the flight path is joined and followed optimally, with respect to these predefined conditions. This second preliminary step, for which the implementation means have not been represented, may be carried out in the form of simulations or in the form of actual guidance operations under genuine flight conditions.

The method described beforehand has many advantages, in particular:
accurate and smooth guidance,
reduced variation in the engine speed, and therefore reduced fuel consumption,
a high degree of comfort for the passengers, and
reduced stresses on the aircraft.

In order to implement said method according to the invention, the device 1 includes, as represented in FIG. 1:
a computation unit 2 which can determine the guidance segment S1 and comprises:
  a computer 3A which receives data (namely the vertical flight path, the position and the altitude of the aircraft) by known means (not represented) via a link 3B, and can calculate the guidance segment S1;
  a computer 3 which is connected by a link 3C to the computer 3A, receives data (namely the position and the altitude of the aircraft A) from known means (not represented) via a link 4 and can calculate the vertical distance he; and
  a computer 5 which is connected by a link 3D to the computer 3A, receives data (namely the velocities Vz and Vzth) from known means (not represented) via a link 6 and can determine the velocity difference ve; and
a computation unit 7 which is connected to said computation unit 2, as specified below, and can calculate and transmit the vertical acceleration variation $\Delta nz$ to be applied to the aircraft A in order to guide it.

Figure 3:
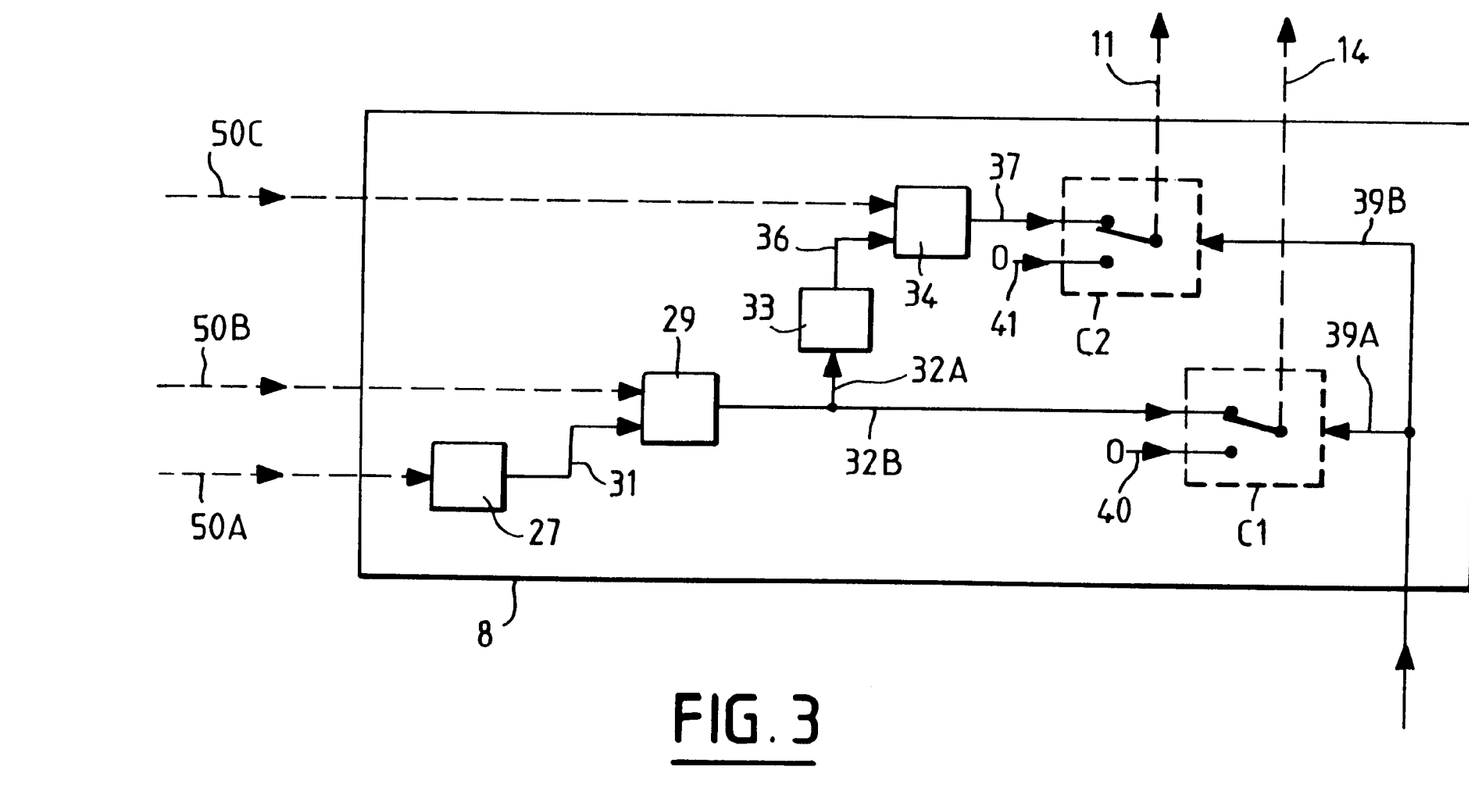
FIG. 3 is the block diagram of an auxiliary computer of the device according to the invention.

To this end, said computation unit 7 includes, according to the invention:
an auxiliary computer 8 which is represented in FIG. 3 and can calculate the precontrol terms hc and vc which are used when the aircraft A is in joining status for the flight path T, as specified below;
a computer 9 which is connected via links 10 and 11, respectively, to said computer 3 and to said auxiliary computer 8 and can calculate the difference he-hc;
a computer 12 which is connected, respectively via links 13 and 14, to said computer 5 and to said auxiliary computer 8 and can calculate the difference ve-vc;

a computer 15 which is connected to the computer 9 via a link 16 and can calculate the expression k1.(he−hc), k1 being determined on the basis of the aforementioned equations (2), (3) and (3b), namely k1=w/(2.ξ);

a computer 17 which receives the results of the processing operations of the computer 15 via a link 18 and can restrict said results so as to obtain a restriction on the vertical velocity Vz of the aircraft A;

a computer 19 which is connected by links 20 and 21, respectively, to the computers 12 and 17 and can calculate the sum of the results received from these computers 12 and 17;

a computer 22 which, on the basis of the results delivered by the computer 19 by a link 23, calculates the expression Δnz=((k1.(he−hc))+(ve−vc)).k2, k2 being determined on the basis of the aforementioned equations (3) and (3b), namely k2=(2..ξw)/g; and a computer 24 which receives this result via a link 25 and can restrict the received value Δnz between two predefined values, for example plus and minus 0.08 g. This makes it possible to obtain a restricted vertical acceleration control and therefore a high degree of comfort in the guidance.

The computer 24 can transmit this result by a link 26 to a user device (not represented), in particular the automatic pilot of the aircraft A, if the latter is equipped with an automatic pilot.

Further, according to the invention, said auxiliary computer 8, which is intended to determine the precontrol terms hc and vc, includes, as represented in FIG. 3:

a computer 27 which can calculate the expression ∫Nzo.dt, that is to say the integral with respect to time of the acceleration Nzo. This acceleration Nzo, which corresponds to the vertical acceleration with which it is desired for the aircraft A to join the guidance segment, is transmitted to the computer 27 by a link 50A specified below;

a computer 29 which calculates the difference between a value veo, which corresponds to the value of ve at the start of the guidance and is received by a link 50B specified below, and the results delivered by the computer 27 by a link 31. Said computer 29 has an output with two links 32A and 32B;

a computer 33 which is connected to said link 32A and integrates with respect to time the results delivered by the computer 29;

a computer 34, taking the sum of a value heo, which corresponds to the value of he at the start of the joining phase and is received by a link 50C specified below, and the result delivered by the computer 33 by a link 36; and two switching means C1 and C2, which are respectively connected to said computer 29 via the link 32B and to said computer 34 via a link 37.

In the case of joining a new segment, the integrators are reset to 0 and the integration takes place with the new Nzo.

Said switching means C1 and C2 are controlled by a computation means 38 which is connected respectively via links 39A and 39B.

Said computation means 38 is intended to determine whether or not the aircraft A is in joining status for the guidance segment, as specified below. Said computation means 38, which receives in particular the values he and ve, as well as the velocity of the aircraft, can calculate the values heo, veo and Nzo.

To this end, said computation means 38 includes, further to the aforementioned links 39A and 39B:

at its input:

a link 35 connected to the link 10, for delivering the value he to said computation means 38;

a link 30 connected to the link 13, for delivering the value ve to said computation means 38; and a link 28 connected to a suitable means (not represented), for delivering the velocity of the aircraft A to said computation means 38; and at its output, the links 50A, 50B and 50C, for delivering the aforementioned data to the auxiliary computer 8.

The processing means of the computation means 38 is described below.

When the aircraft A is in joining status for the prescribed flight path, the switching means C1 and C2 are operated in such a way that the links 14 and 11 are connected respectively to said links 32B and 37. However, when the aircraft is no longer in joining status, these links 14 and 11 are connected to links 40 and 41 which transmit zero values.

Thus, the precontrol terms transmitted by the auxiliary computer 8 are the values:

$$\begin{cases} vc = -\int Nzo \cdot dt + veo \\ hc = \int vc \cdot dt + heo \end{cases}$$

when the aircraft A is in joining status for the flight path, and vc=hc=0 in the converse case (that is to say, in particular, when the aircraft A lies on a straight segment which it is following).

According to the invention, the aircraft A is in joining status for a straight segment when it can join said straight segment with a constant vertical acceleration.

More precisely, this is done when the following conditions are satisfied:

the constant vertical acceleration with which the aircraft could join the flight path lies in a predefined interval, preferably plus and minus 0.15 g, g being the acceleration due to gravity;

the terms ve and he are of opposite signs; and the velocity of the aircraft is restricted to a predefined value, for which it is possible to join the flight path smoothly.

The device 1 also includes a means which is integrated, for example, in the computation unit 2 and makes it possible to determine a change of guidance segment on said predefined flight path T, that is to say a change of the segment to be taken into account for implementing the guidance. In the context of the present invention, the term current guidance segment is used to denote the guidance segment at the time in question.

Figure 4:
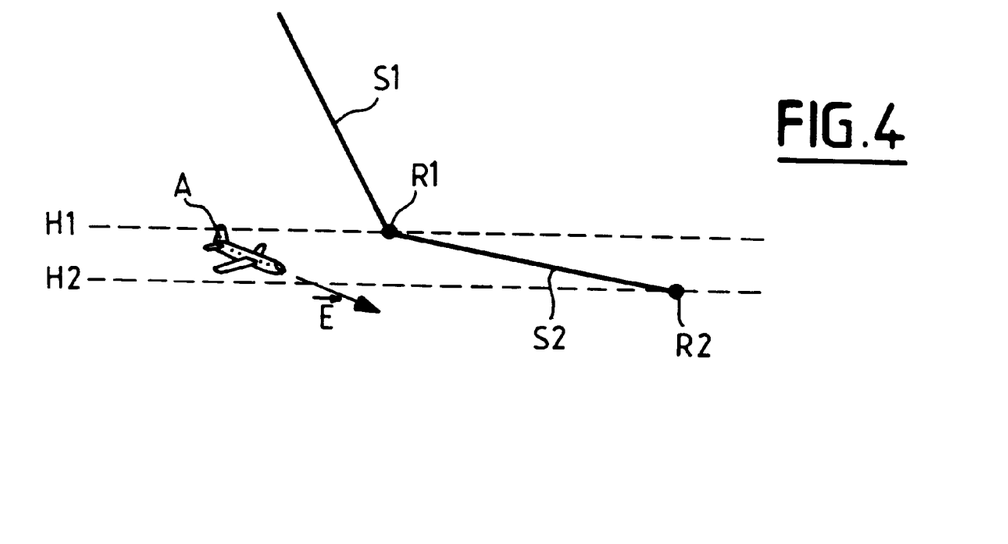
FIGS. 4 to 7 illustrate four different situations, for which it is necessary to change the guidance segment.
Figure 5:
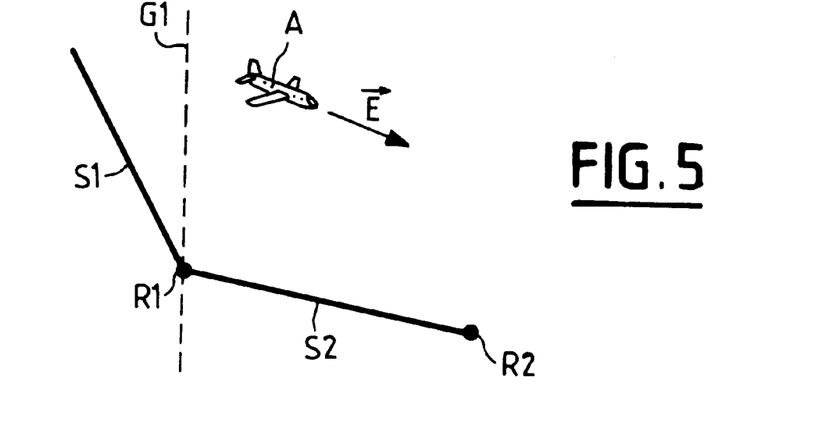
Figure 6:
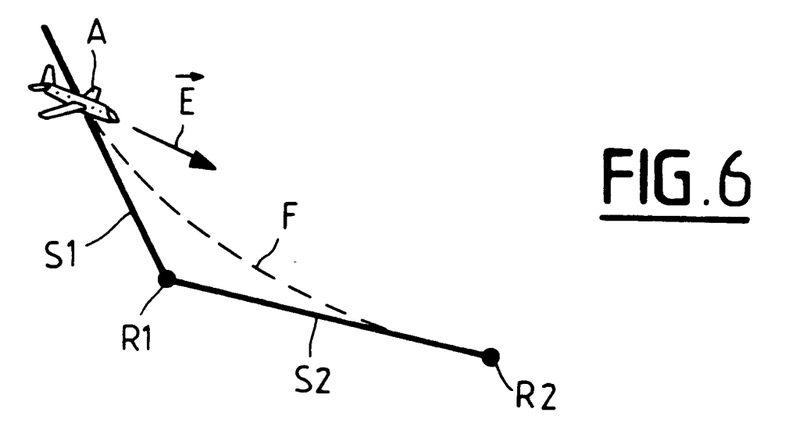
Figure 7:
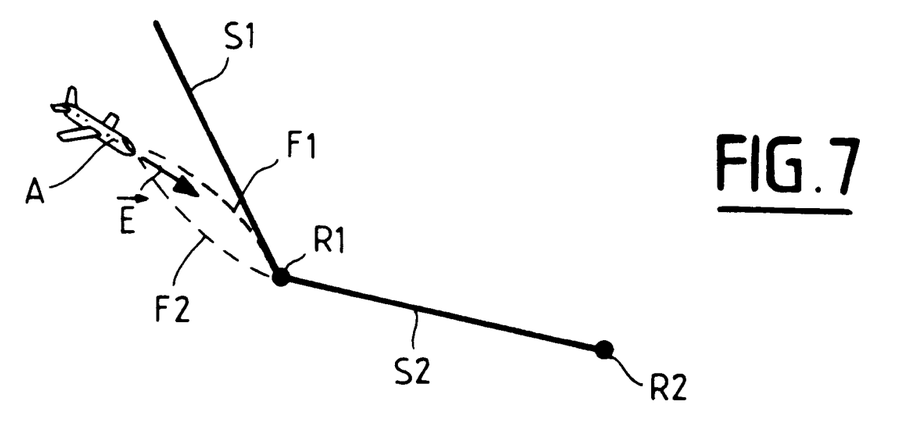

According to the invention, the guidance segment is changed, and the segment S2 which follows the current guidance segment S1 (in the direction of displacement $\vec{E}$ of the aircraft A) is considered as the new guidance segment each time one of the following situations is satisfied:

the altitude of the aircraft A is less than the altitude H1 of the extreme point R1, in the direction of displacement $\vec{E}$ of the aircraft A, of said current guidance segment S1, as represented in FIG. 4;

the aircraft A is downstream, in the direction of displacement $\vec{E}$, of said extreme point R1 of the current guidance segment S1, as illustrated in FIG. 5 by means of the vertical G1 passing through the point R1;

the aircraft A is in following status for said current guidance segment S1 and is in joining status for the following segment S2 (which it can join by following an optimum path F generated by the guidance according to the invention), as represented in FIG. 6; or the aircraft A is in joining status both for the current guidance segment S1 (as illustrated by a path F1 in FIG. 7) and for the following segment S2 (as illustrated by a path F2), but it can no longer return to the current guidance segment S1 before having passed the extreme point R1 of said current guidance segment S1.

It will be noted that the invention also provides a restriction on the overshoot with respect to a guidance segment when such a guidance segment is being joined.

The nonlimiting illustrative embodiment described above clearly demonstrates the many advantages of the present invention.

Of course, in the context of the present invention, the aforementioned method may be implemented using a single computer or by any other suitable computation architecture.

We claim:

1. A method for guiding an aircraft (A) in a vertical plane in order to join and follow a prescribed flight path (T) which is defined in said vertical plane and is formed by successive straight segments (S1, S2), wherein the following operations are performed repeatedly:

the straight segment (S1) which belongs to said flight path (T) and relative to which said aircraft (A) is to be guided, is determined;

the vertical distance he, between said aircraft (A) and the guidance segment (S1) thus determined, is determined;

the velocity difference ve between the actual vertical velocity (Vz) of the aircraft (A) and the vertical velocity (Vzth) which it would have if it moved along said guidance segment (S1), for an equal velocity parallel to the ground, is determined;

a vertical acceleration variation $\Delta nz$ is calculated from the equation:

$$\Delta nz = ((k1 \cdot (he-hc)) + (ve-vc)) \cdot k2$$

in which:
k1 and k2 represent characteristic coefficients,
hc and vc represent precontrol terms, of nonzero values when the aircraft is in flight path joining status, and of zero values when the aircraft is in flight path following status, and
the product $k1 \cdot (he-hc)$ is restricted between two predefined values; and
the vertical acceleration variation $\Delta nz$ thus calculated and restricted between two predefined values is applied as control input to the aircraft (A).

2. The method as claimed in claim 1, wherein the product $k1 \cdot (he-hc)$ is restricted between two values making it possible to guide the aircraft (A) at restricted vertical velocity (Vz).

3. The method as claimed in claim 1, wherein the vertical acceleration variation applied as control input to the aircraft is restricted between two values allowing smooth guidance of the aircraft (A).

4. The method as claimed in claim 1, wherein the aircraft (A) is considered to be in joining status for a straight segment (S1) of the flight path (T) when it can join said straight segment (S1) with a constant vertical acceleration.

5. The method as claimed in claim 4, wherein the aircraft (A) is considered to be in joining status for the flight path (T) when the following conditions are satisfied:

the constant vertical acceleration $Nz=(ve^2)/(2he)$ with which the aircraft (A) could join said prescribed trajectory lies in a predefined interval;

the terms ve and he are of opposite signs; and the velocity of the aircraft (A) is restricted to a predefined value, for which joining can be carried out smoothly.

6. The method as claimed in claim 1, wherein the aircraft (A), considered to be in joining status, changes to following status when the velocity difference ve becomes less than a predetermined threshold.

7. The method as claimed in claim 1, wherein the precontrol terms hc and vc are determined from the following equations:

$$\begin{cases} vc = \int Nzo \cdot dt + veo \\ hc = \int vc \cdot dt + heo \end{cases}$$

in which:
veo and heo are the values of ve and he respectively at the start of joining, and
Nzo is defined by the equation $Nzo=(veo^2)/(2heo)$.

8. The method as claimed in claim 1, wherein, in order to determine said guidance segment, said flight path (T) having a decreasing altitude, possibly with level sections:

a) when the method is initially implemented, an initial segment is determined as the guidance segment; and b) during the guidance, the segment (S2) which follows the current guidance segment (S1) in the direction of displacement ($\vec{E}$) of the aircraft (A) is determined as the guidance segment each time at least one of the following situations is satisfied:

the altitude of the aircraft (A) is less than the altitude (H1) of the extreme point (R1), in the direction of displacement ($\vec{E}$) of the aircraft (A), of said current guidance segment (S1);

the aircraft (A) is downstream, in the direction of displacement ($\vec{E}$), of said extreme point (R1) of the current guidance segment (S1);

the aircraft (A) is in follow status for said current guidance segment (S1) and is in joining status for the following segment (S2); and the aircraft (A) is in joining status both for the current guidance segment (S1) and for the following segment (S2), but can no longer return to said current guidance segment (S1) before having passed the extreme point (R1) of said current guidance segment (S1).

9. The method as claimed in claim 1, wherein the characteristic coefficients k1 and k2 are calculated from the equations:

$$k1 = w/(2 \cdot \xi) \quad k2 = (2 \cdot \xi \cdot w)/g$$

in which:
g represents the acceleration due to gravity,
$\xi$ represents a damping term, and
w represents an angular frequency term at the resonant frequency.

10. The method as claimed in claim 9, wherein, in order to specify the values of the terms $\psi$ and w, a plurality of guidance operations are carried out with different terms, making it possible to refine the theoretically determined parameters, and the values used for implementing the method are those for which the flight path is joined and followed optimally, with respect to predefined conditions.

11. A device for implementing the method specified under claim 1, which includes:

a first computation unit (2) which can determine the guidance segment and comprises:
- a first computer (3) which can determine said vertical distance he, and
- a second computer (5) which can determine said velocity difference ve; and a second computation unit (7) which is connected to said first computation unit (2) and can calculate said vertical acceleration variation $\Delta nz$ and transmit it to the automatic pilot of the aircraft.

12. The device as claimed in claim 11, wherein said second computation unit (7) includes:

an auxiliary computer (8) which can calculate the pre-control terms hc and vc;

a first computer (9) which is connected to said auxiliary computer (8) and can calculate the difference he–hc;

a second computer (15) which is connected to said first computer (9) and can calculate the product k1.(he–hc);

a third computer (17) which can restrict the value calculated and delivered by the second computer (15);

a fourth computer (12) which is connected to said auxiliary computer (8) and can calculate the difference ve–vc;

a fifth computer (19) which can calculate the sum of the results delivered by the third and fourth computers (17, 12);

a sixth computer (22) which can multiply by k2 the result delivered by the fifth computer (19); and a seventh computer (24) which can restrict the result delivered by the sixth computer (22) and transmit this result as control input.

13. The device as claimed in claim 11, which includes a means (38) which can determine whether said aircraft (A) is in joining status for the flight path (T).

* * * * *